United States Patent
Kandala et al.

(10) Patent No.: US 6,289,061 B1
(45) Date of Patent: Sep. 11, 2001

(54) WIDEBAND FREQUENCY TRACKING SYSTEM AND METHOD

(75) Inventors: Srinivas Kandala, Vancouver, WA (US); V. Srinivasa Somayazulu, Tigard, OR (US); John M. Kowalski; Hirohiko Yamamoto, both of Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/160,551

(22) Filed: Sep. 24, 1998

(51) Int. Cl.[7] ........................................ H04L 27/06
(52) U.S. Cl. .................... 375/344; 375/347; 375/326; 455/132; 455/137
(58) Field of Search .................. 375/344, 326, 375/347, 134, 136, 137; 455/164.1, 180.3, 182.2, 255, 136, 137, 132; 370/335, 342, 441, 336, 334

(56) References Cited

U.S. PATENT DOCUMENTS

| | | | |
|---|---|---|---|
| 4,370,520 | * | 1/1983 | Malchow ............................ 179/1 |
| 4,956,864 | * | 9/1990 | Brockman ........................... 380/34 |
| 5,361,276 | | 11/1994 | Subramanian ...................... 375/1 |
| 5,461,646 | * | 10/1995 | Anvari .............................. 375/347 |
| 5,594,754 | * | 1/1997 | Dohi et al. ....................... 375/200 |
| 5,809,020 | * | 9/1998 | Bruckert et al. .................. 370/335 |
| 5,870,669 | * | 2/1999 | Kawai .............................. 435/209 |

OTHER PUBLICATIONS

Abstract entitled, "A Frequency Tracking Rake Demodulator for Multipath Channels" authored by Gong K. S. et al., proceedings of the military communications conference (Milcom), US, New York, IEEE, vol.–, Sep. 30, 1990, pp. 0102–1024, XP000221670.

* cited by examiner

*Primary Examiner*—Stephen Chin
*Assistant Examiner*—Mohammad Ghayour
(74) *Attorney, Agent, or Firm*—David C. Ripma; Matthew D. Rabdau; Scott C. Krieger

(57) ABSTRACT

A wideband receiver automatic frequency control (AFC) system which combines multipath or diverse antenna signals, before the carrier frequency error is determined, is provided herein. Rather than independently calculating the frequency error of each transmission path, frequency error is calculated after the multipath signals are summed together. Thus, only a single frequency detector circuit is required. The resulting automatic frequency control system has the accuracy of a system which combines the independently calculated frequency errors, with fewer steps of computation required. A method for combining multipath signals to calculate an average AFC frequency error is also provided.

4 Claims, 8 Drawing Sheets

WIDEBAND FREQUENCY TRACKING SYSTEM AND METHOD

BACKGROUND AND SUMMARY OF THE INVENTION

This invention relates generally to wireless communications, and more particularly to an improved system and method for wideband for tracking the carrier frequency of a multipathed transmission.

Spread spectrum communication techniques allow communicating users to operate in noisy radio frequency (RF) spectrums, and are especially effective against narrow-band interferers. Spread spectrum communications can be effected at relatively low power spectral densities, and multiple users can share the same frequency spectrum. Further, receivers can be designed to take advantage of multipath. These system characteristics encouraged early development of the technology by the military.

Common forms of spread spectrum systems include chirp, frequency hopping, and direct sequence or pseudonoise (PN). The chirp system transmits an impulse signal in the time domain that is spread monotonically in the frequency domain. A receiver converts the spread frequency signal back into an impulse signal. These frequency-spread impulse signals have applications in radar, for the pulse position modulation of information, or both, such as the $R^3$ transponder developed by General Dynamics, Electronics Division in the 1970s. Frequency hopping systems communicate by synchronizing users to simultaneously change the communication frequency.

Direct Sequence systems spread a digital stream of information, typically in a quadriphase modulation format, with a PN code generator, to phase shift key modulate a carrier signal. The pseudonoise sequence of the PN code generator is periodic, and the spread signal can be despread in a receiver with a matching PN code. Direct Sequence systems have excellent immunity to noise. The PN codes used typically permit a large number of users to share the spectrum, with a minimum of correlation between the user's PN codes. However, Direct Sequence system require large RF bandwidths and long acquisition times.

A third generation, wideband CDMA (W-CDMA) system is in development as described in "Wideband-CDMA Radio Control Techniques for Third Generation Mobile Communication Systems", written by Onoe et al., IEEE $47^{th}$ Vehicular Technology Conference Proceedings, May 1997, that may have global applications. Instead of a pilot channel, the W-CDMA system has a broadcast, or perch channel. Each timeslot, or slot of the broadcast channel consists of a series of time multiplexed symbols. A long code masked, or special timing symbol segment uses just a short code to spread one symbol of known information. This segment allows a mobile station to acquire system timing information immediately after turn-on.

In most communication systems the signal is transmitted around a carrier signal which has a certain frequency. A receiver in the system acquisitioning this signal must ensure that its local oscillator frequency is operating a frequency very close to that of the transmitters to ensure demodulation. The control of the local oscillator is maintained through a mechanism called automatic frequency control (AFC).

Many cellular communication systems use a wideband signal for the transmission of data. The wideband carrier signal permits the receiver to resolve the transmitted signal into a number of paths. Each path can be used to generate a signal to control the frequency of the local oscillator. Typically, in cellular communications the wideband signal used is a CDMA signal.

Any communication system needs a close tracking of the frequency of the received carrier. Although CDMA systems are robust in the reception of multipathed signals, it is still necessary to properly acquire the carrier frequency to ensure proper demodulation. Receiver clock inaccuracies, transmitter frequency drift, and doppler effects require that the CDMA receiver track and adjust the carrier frequency of each multipath signal.

FIG. 1 illustrates the automatic frequency control (AFC) system 10 of a CDMA receiver (prior art). The received signal on lines 12a, 12b, and 12c is sampled at a frequency of $f_s$ samples/sec. Each of the signals is then matched to a local oscillator (LO) frequency generated by a Numerically Controlled Oscillator (NCO) 14, and then passed to frequency detectors 16a, 16b, and 16c. That is, each despread signal is mixed with the LO with mixers 18a, 18b, and 18c, and a down-converted signal, proportional to the frequency of its corresponding despread signal is generated and passed to frequency detectors 16a, 16b, and 16c. The outputs of frequency detectors 16a, 16b, and 16c are error signals proportional to the difference in the carrier frequency of the signal and the local oscillator frequency. These error signals are summed in combiner 19 before application to NCO 14. Frequency detection is achieved by matching the despread signal with a delayed version of its own and then performing the phase detection on it. Some systems shift the signal in the detection process. This shift is compensated for by pre-shifting the despread signal before introduction to frequency detectors 16a, 16b, and 16c.

Combining error signals increases the reliability of tracking he carrier frequency, as opposed to using the error signal from only one path. However, as can be seen from FIG. 1, several frequency detectors are required after pre-shifting each of the despread signals. This makes the tracking scheme very complex, requiring several multiplication operations.

Co-pending patent application, Ser. No. 09/015,424, invented by Kowalski et al. entitled SYSTEM AND METHOD FOR CDMA CHANNEL ESTIMATION, attorney docket no. SMT 301, filed on Jan. 29, 1998, and assigned to the same assignees as the instant application, discloses a procedure for using timing derived from the perch channel in a wideband CDMA system to despread and demodulate the traffic channels. Although the system simplifies the operation of the traffic channel, no particular system for simplifying the AFC is presented.

Co-pending patent application, Serial No. 09/048,240 invented by Kowalski et al. entitled PILOT AIDED, TIME-VARYING FINITE IMPULSE RESPONSE, ADAPTIVE CHANNEL MATCHING RECEIVING SYSTEM AND METHOD, attorney docket no. SMT 315, filed on Mar. 25, 1998, and assigned to the same assignees as the instant application, discloses a system which simplifies the timing and demodulation of traffic channels, but no specific system to simplify the AFC is disclosed.

It would be advantageous if a CDMA receiver design could simplify the AFC function to reduce the number of parts, decrease the receiver's power consumption, and reduce the number of arithmetic operations.

It would be advantageous if the AFC function in a CDMA receiver could be simplified without impacting the accuracy and performance of the receiver in tracking carrier frequencies.

It would be advantageous if the number of frequency discriminators, or frequency discriminator operations could be reduced without impacting the accuracy and performance of the receiver in tracking carrier frequencies.

Accordingly, in a wideband wireless communication system, such as a CDMA or W-CDMA system, a method for generating automatic lo frequency control (AFC) to track the carrier frequency of communication signals received along a plurality of transmission paths, with corresponding Doppler frequency shifts or frequency errors is provided. Typically, such a system includes mobile stations receiving communications from at least one base station. The method comprising the steps of:

a) combining carrier signals from each transmission path, whereby an average carrier signal is derived; and b) in response to the average carrier signal derived in Step a), calculating the frequency error of the average carrier signal. In this manner, only a single frequency error computation is performed. The frequency of the carrier signal received is not always the same frequency as transmitted. Therefore, even when the carrier frequency is known at the receiver, adjustment and acquisition are necessary for proper demodulation.

The advantage of the present invention is that only one average need be calculated from the input signals of many transmission paths. As is shown below, the single average is used to correct all the input carrier signals. The inventions permits the accuracy derived from using several input carrier signals frequencies in the average calculation, with the simplicity of calculating a single average.

Typically, the carrier signal is down-converted for processing. Then, a reference signal, having a reference frequency, is generated. The reference signal is a local oscillator (LO) signal with a LO frequency. In response to a comparison of the reference signal and the carrier signal for each transmission path, a down-converted signal is generated for each transmission path. The step of generating each down-converted signal includes mixing the LO signal with the received carrier signal of each transmission path. Step a) then includes combing the down-converted signals.

The method further comprising a step, following Step b), of:

c) in response to the frequency error calculated in Step b), changing the reference frequency, whereby the down-converted frequency of each transmission path is corrected with a single error signal.

The method includes the further steps of:

d) comparing the signal to noise ratio of the down-converted signal of each transmission path with the signal to noise ratio of the average down-converted signal generated in Step a);

e) in response to the difference between the signal to noise ratios calculated in Step d), calculating a weight for each transmission path; and in which Step a) includes, in response to the weights calculated in Step d), variably adjusting the importance of each transmission path in the averaging of the down-converted signals, hereby the signal to noise ratio of the combination of received signals is improved.

In some aspects of the invention, the previous average down-converted signal is stored. Then, Step b) includes the sub-steps of:

1) detecting changes between the current average down-converted signal and the average down-converted signal in storage, whereby a frequency change is measured;

2) generating an error signal in response to the frequency change detected in Step b)2); and in which Step c), in response to the error signal generated in Step b)2), includes changing the reference frequency.

Each transmission path has a corresponding time delay, and further steps, precede Step a), of:

sampling the received communication signals at a rate of $f_s$;

measuring a time delay equal to $1/f_s$;

disregarding communication signals received after the $1/f_s$ time delay has expired; and in which Step a) includes summing the received communication signals having a time delay less than, or equal to the time duration $1/f_s$, whereby the average received communication signal frequency error is less noisy.

An automatic frequency control (AFC) system to track the carrier frequency of received multipath communications is also provided comprising a combiner having a plurality of inputs, with each input corresponding to a transmission path. The combiner accepts received communication signals with received communication frequencies, and has an output to provide an average received communication signal. The AFC system also comprises a frequency error calculator having an input operatively connected to the combiner output to accept the average received communication signal. The frequency error calculator has an output to provide an frequency error signal in response to the average received communication signal, whereby the multipathed received signals are averaged before the frequency error is calculated.

A plurality of fingers parallely process received communication signals. Each finger has an input to accept a received communication signal corresponding to a transmission path and provides the received communication signal at an output operatively connected to a corresponding input of the combiner.

A multiplier has a first input to accept a reference signal with a reference frequency, and second input to accept the received carrier signals. The multiplier mixes the carrier signals with the reference signal to provide down-converted signals with received frequencies at an output. The fingers each accept a down-converted signal from the multiplier output, and the combiner provides an average down-converted signal.

The frequency error calculator includes a frequency discriminator having an input operatively connected to the combiner output to accept the average down-converted signal. The frequency discriminator measures the change in the average down-converted signal frequency and provides the error signal at an output.

DETAILED DESCRIPTION OF THE PREFERRED EMBODIMENT

Figure 2:
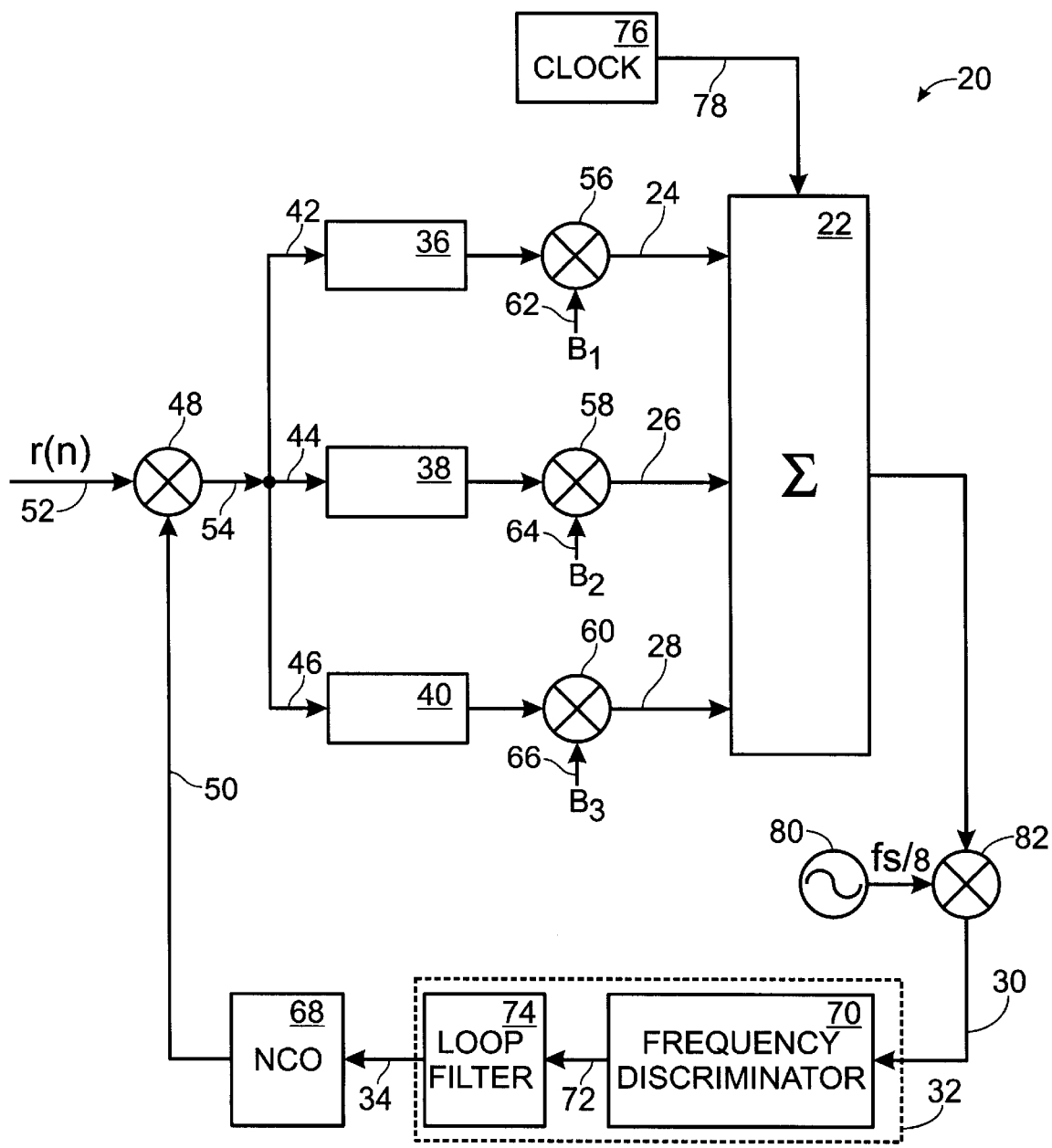
FIG. 2 is a schematic block diagram of a wideband wireless communication system receiver of the present invention.

FIG. 2 is a schematic block diagram of a wideband wireless communication system receiver 20 of the present invention. Receiver 20 accepts communications propagated along a plurality of transmission paths with corresponding doppler frequency shifts. Receiver 20 features an automatic frequency control (AFC) system to track the carrier frequency of received communications. Receiver 20 comprises a combiner 22 having a plurality of inputs with input lines 24, 26, and 28. Each input and input line 24, 26, and 28 corresponds to a transmission path, and accepts received communication signals with received communication frequencies. Combiner 22 has an output on line 30 to provide an average received communication signal.

Receiver 20 also comprises a frequency error calculator 32 having an input on line 30 operatively connected to the output of combiner 22 to accept the average received communication signal. Frequency error calculator 32 has an output on line 34 to provide an frequency error signal in response to the average received communication signal. In this manner, the multipathed received signals are averaged before the frequency error is calculated.

Receiver 20 further comprises a plurality of fingers 36, 38, and 40 to parallely process received communication signals. Fingers 36, 38, and 40 each have an input, respectively, on lines 42, 44, and 46 to accept a received communication signal corresponding to a transmission path. Fingers 36, 38, and 40 provide the received communication signal at outputs operatively connected, respectively, to lines 24, 26, and 28, and to a corresponding input of combiner 22. The choice of three finger sections is arbitrary. In a CDMA system, finger 36, 38, and 40 are despreaders.

Receiver 20 further comprising a multiplier 48 having a first input on line 50 to accept a reference signal, having a reference frequency.

Multiplier 48 has a second input on line 52 to accept the received carrier signals. Multiplier 48 mixes the carrier signals with the reference signal to provide first received signals with first received frequencies at an output on line 54. Fingers 36, 38, and 40 each accept a first received signal from the output of multiplier 48. In this manner, combiner 22 provides an average first received signal.

In some aspects of the invention, receiver 20 further comprises a plurality of variable weighting circuits 56, 58, and 60, with weighting circuits 56, 58, and 60 each corresponding to a transmission path. Each weighting circuit 56, 58, and 60 has an input to accept the first received signal from corresponding fingers 36, 38, and 40. Weighting circuits 56, 58, and 60 have a second input to accept a gain control signal, respectively, on lines 62, 64, and 66. The gain control signals B1, B2, and B3 are responsive to the signal to noise ratio of the first received signal, and are used to control the gain of first received signal. Each weighting circuit 56, 58, and 60 has an output operatively connected to a corresponding input of combiner 22, respectively on lines 24, 26, and 28 to provide the weighted first received signal.

Receiver 20 further comprises an oscillator 68, such as a numerically controlled oscillator (NCO) having an output on line 50 operatively connected to multiplier 48 first input to provide the reference frequency. NCO 68 has an input on line 34 operatively connected to frequency error calculator 32 output to received the frequency error signal. Oscillator 68 varies the reference frequency in response to the frequency error signal.

Frequency error calculator 32 includes a frequency discriminator 70 having an input operatively connected on line 30 to the output of combiner 22 to accept the average first received signal. Frequency discriminator 70 measures the change of frequency in the average first received signal, and provides the error signal at an output on line 72. In some aspects of the invention, a loop filter 74 is used to condition the error signal.

In some aspects of the invention, receiver 20 further comprises a clock 76 having an output on line 78 to provide a periodic time interval measurement of $1/f_s$, where $f_s$ is the rate at which the received multipathed signal is sampled. Then, combiner 22 has a clock input operatively connected to the output of clock 76 on line 78 to accept the $1/f_s$ time interval measurements. Combiner 22 sums the communication signals received over a time interval of $1/f_s$ and disregards communication signals received after the $1/f_s$ time delay has expired to calculate an average received communication signal. In this manner, the average received communication signal frequency error is less noisy.

Figure 1:
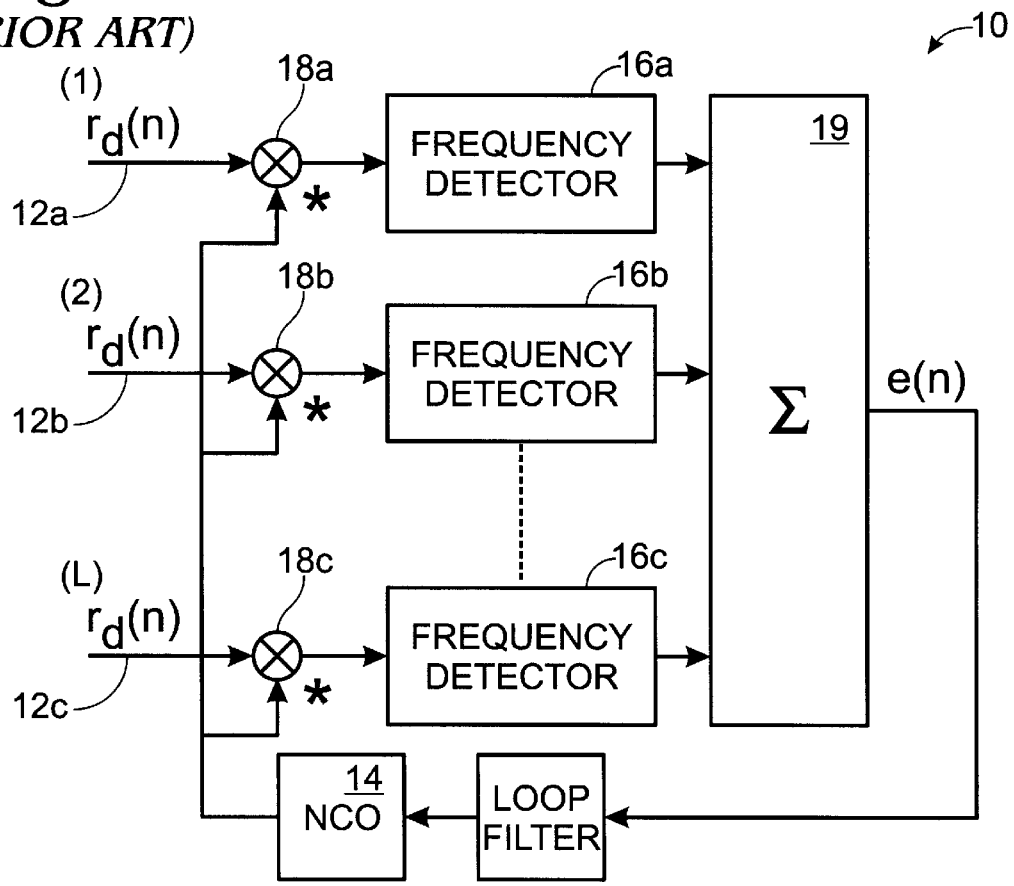
FIG. 1 illustrates the automatic frequency control (AFC) system 10 of a CDMA receiver (prior art).

The scheme illustrated in FIG. 2 depicts the weighted received despread signals being combined and, then shifted ($f_s/8$), by phase shifter 80, before application, through mixer 82, to frequency detector 70. The choice of this phase value is arbitrarily dependent on the type of frequency detector used, and other loop parameters. As can been seen from FIG. 2, this embodiment of the invention uses only one frequency detector 70, thus decreasing the number of operations to be performed. Referring momentarily to FIG. 1, it can be seen that prior art AFC systems require a frequency detector is every receiver finger.

Returning again to FIG. 2, the weights (B1, B2, and B3) on lines 62, 64, and 66 are determined by maximal ratio combining for maximizing the signal-to-noise ratio. However, in a preferred embodiment of the invention weighting circuits 56, 58, and 60 are eliminated. The rationale for eliminating weighting circuits 56, 58, and 60, simplifying the frequency tracking process even further, is discussed in greater detail below.

Figure 3:
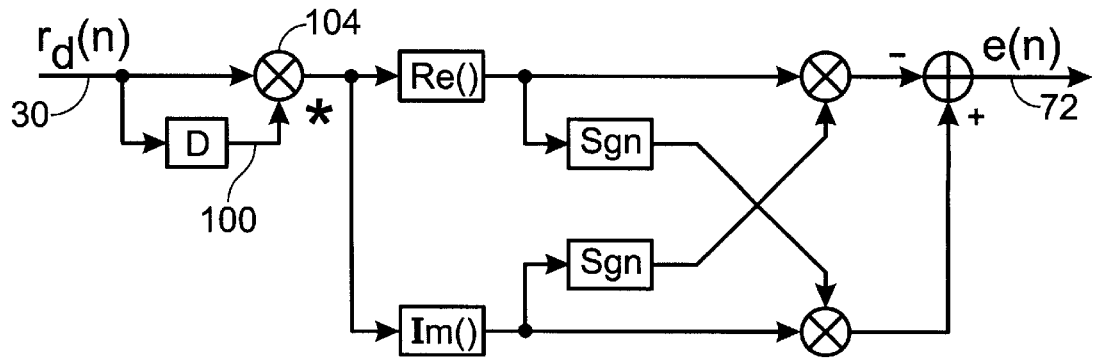
FIG. 3 illustrates an exemplary frequency detector (prior art).

FIG. 3 illustrates an exemplary frequency detector 70 (prior art). The details of frequency detector 70 are well known, and will not be discussed in detail. The combined signal on line 30 is delayed through delay circuit 100, a typical delay is one symbol in a CDMA system. The combined signal on line 30 is matched to a delayed version of itself. That is, the delayed signal on line 100 is mixed with the original combined signal on line 30, at multiplier 104. Hence, all the weights can be set to 1. That is, weighting circuits 56, 58, and 60 are removed.

Figure 4:
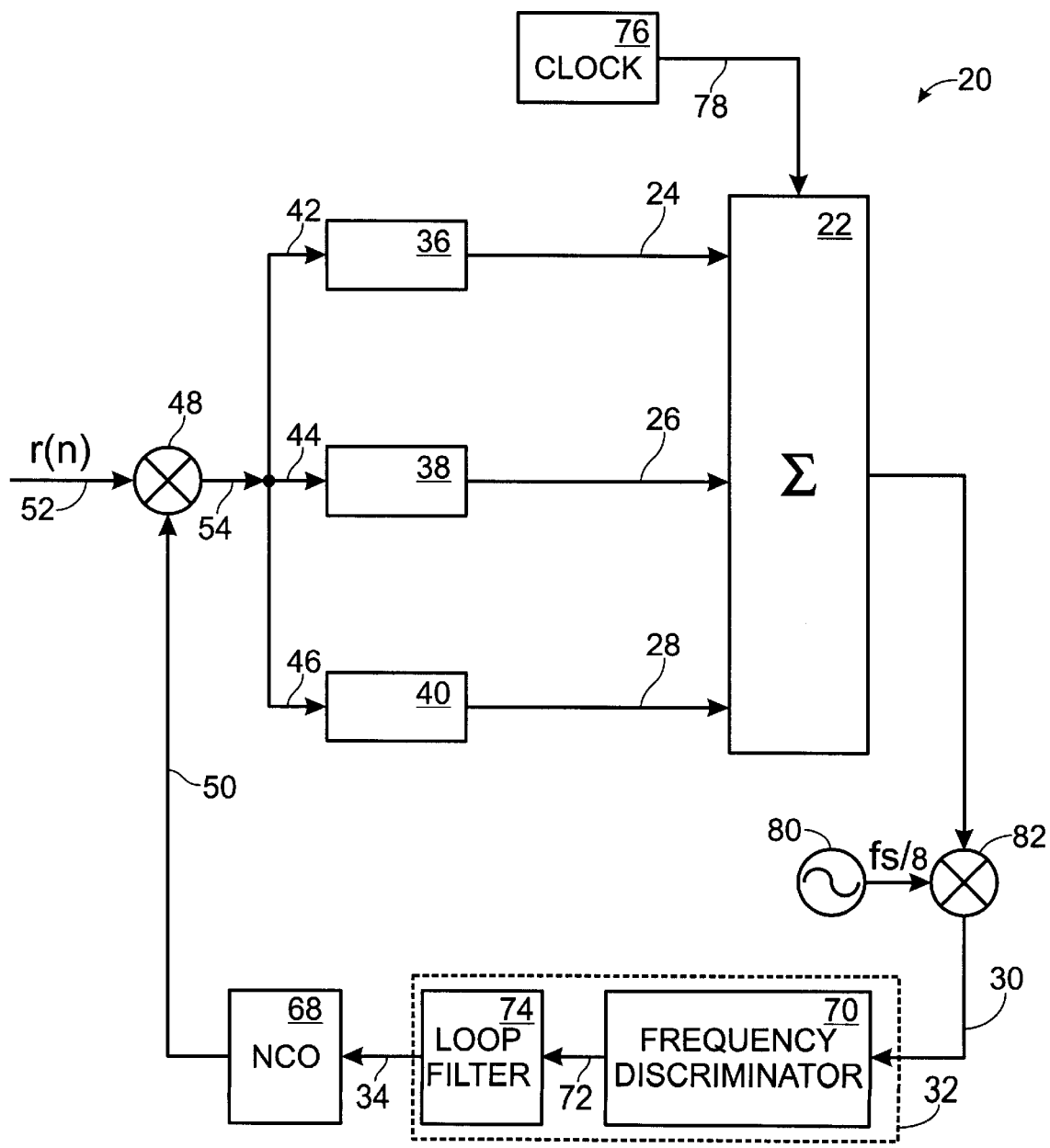
FIG. 4 illustrates a receiver with weighting circuits eliminated.

FIG. 4 illustrates receiver 30 with weighting circuits 56, 58, and 60 eliminated. Simulations have shown that the invention illustrated in FIG. 4 has a performance is comparable, and even better than the performance of the prior art circuit of FIG. 1. The present invention of FIG. 4 reduces complexity without any compromise on the performance.

Figure 5:
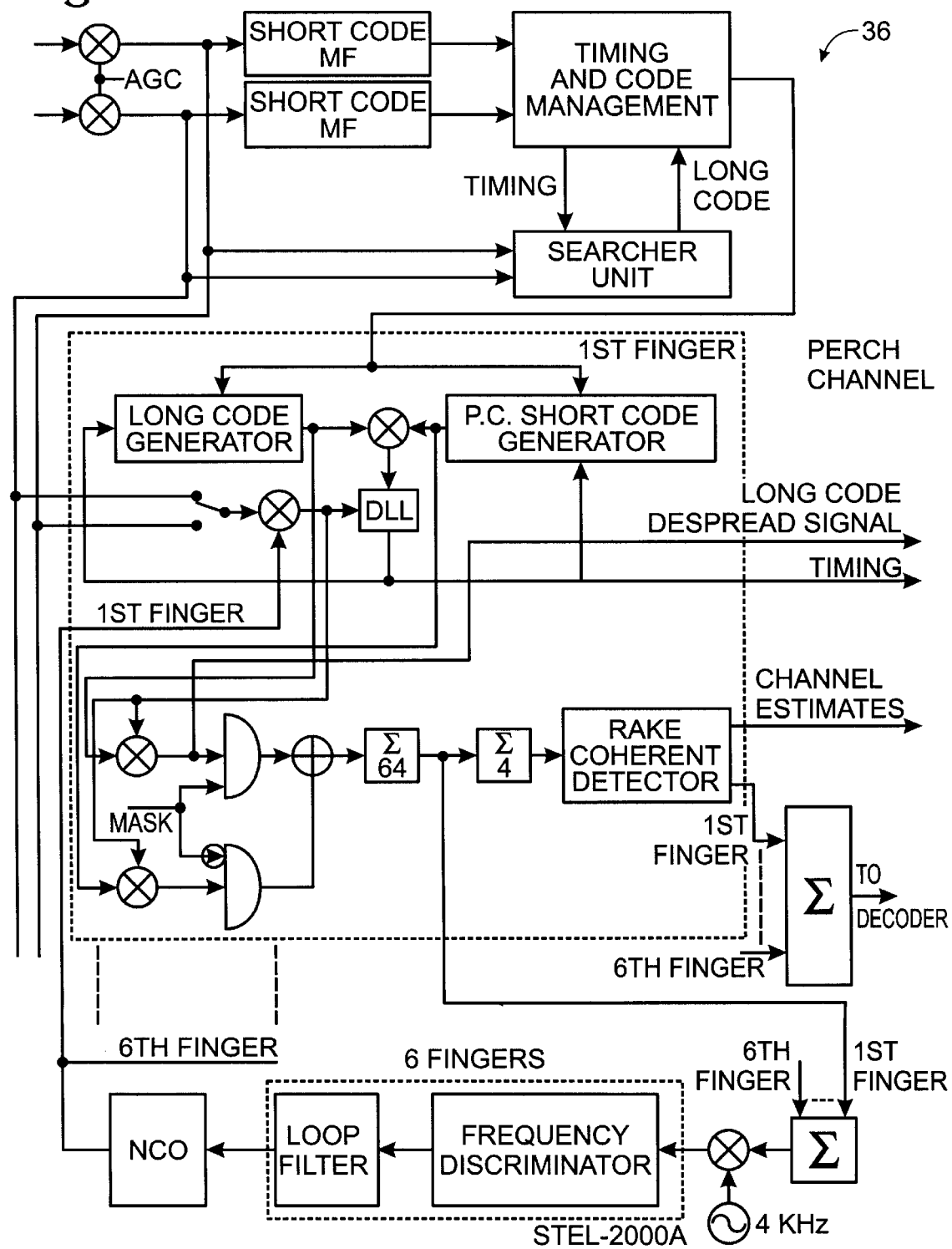
FIG. 5 illustrates a receiver with a detailed view of finger section.

FIG. 5 illustrates receiver 20 with a detailed view of finger section 36. For clarity, only one finger is shown. Finger section 36 shown in FIG. 5 has been disclosed in co-pending patent application, Ser. No. 09/048,240 and 09/015,424, invented by Kowalski et al. However, the AFC combination concept described above is applicable in any wideband system where several copies of the same received signal are available due to multi-path or antenna diversity.

The embodiment in the prior art (FIG. 1) and the present invention of FIGS. 2 and 4 implicitly assume that the delay spread channel is not much larger than the sampling duration $1/f_s$. However, this might not be the case in all situations, and the breakdown of the above assumption will lead to loss of tracking. To circumvent this situation, the paths whose epoch is larger than several symbols can be dropped for generating the error signal. This can be achieved by examining the output of the matched filter of finger 36 within a certain window of time and include only the paths that are within the window. That is, paths with an epoch larger than sampling duration $1/f_s$ are not included in multipath signal averaging. The concept applies to slightly larger or smaller sampling durations.

The methods described here are developed for the application in W-CDMA system. However, it should be pointed out that the schemes are general enough and can be applied for any type of broadband system which allows the resolution of multiple paths. The goal of the invention described herein is to provide a robust design of the AFC which can track and control a local oscillator drift of about 3 ppm at 2 GHz. The AFC is designed so that this frequency drift is brought down to 0.1 ppm.

Figure 6:
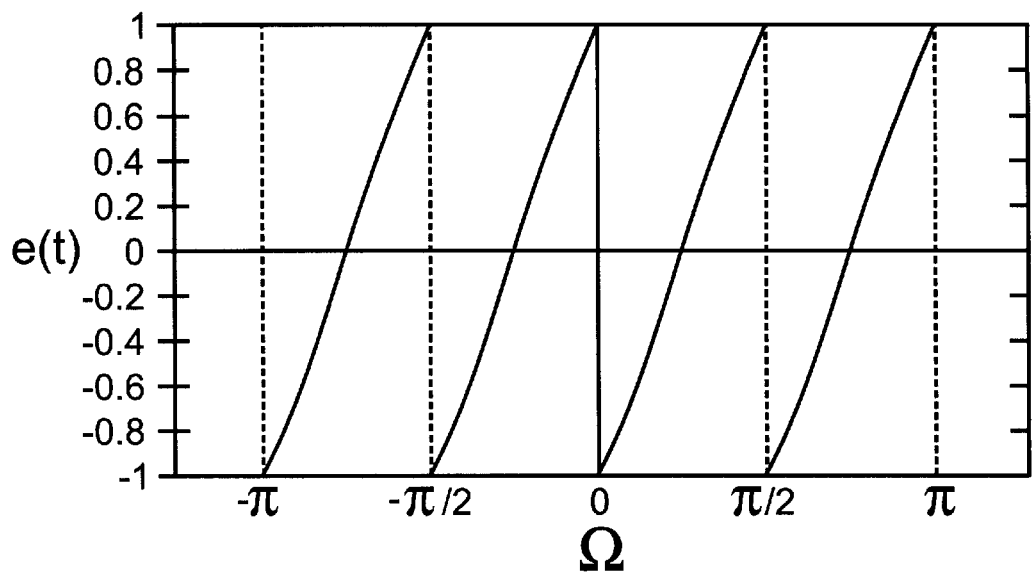
FIG. 6 is a plot of the error signal e(t) in FIG. 3 as a function of the despread signal's discrete frequency Ω.

Returning to FIG. 3, the input to discriminator 70 is the despread signal, sampled at the rate of $1/f_S$. The despread signal is matched to the delayed despread signal in multiplier 104 and the error signal is computed from the resulting signal. FIG. 6 is a plot of the error signal e(t) in FIG. 3 as a function of the despread signal's discrete frequency $\Omega$. The output of discriminator 70 has saw-tooth characteristics and is linear only in the range of $(n-1)\pi/2, n\pi/2)$, where $n=-1, \ldots, 2$. The output is identical for the frequency $\Omega_0+n\pi/2$. Any shifts of over $\pi/2$ are ignored, and the data modulation is disregarded in the computation of the error signal. However, it is desirable that discriminator 70 operate linearly in the range of $(-\theta, \theta)$, where $\theta$ is the maximum possible drift in discrete frequency of the local oscillator. When the discrete frequency of the despread signal is shifted by $\pi/4$ before application to discriminator 70, $\theta$ becomes $\pi/4$. This also implies that frequency discriminator 70 detects a frequency drift as large as $\Delta f=\pm 1/(8*f_s)$.

According to the W-CDMA specifications, the maximum possible drift of the oscillator is 3 ppm which translates to a drift of 6 kHz for a carrier frequency of 2 GHz. Setting $|\Delta f|=8$ kHz, $T_s=64000$. Thus, the despread signal should be sampled at 64,000 samples/sec. to be able to track a drift as large as 8 kHz. This number is particularly suitable as a clock, as this rate is already available in the system. Note that even though this scheme should track upto 8 KHz, it is advisable to use only for frequency errors of about 6 kHz so that the effects of noise do not significantly influence the performance of the loop.

Returning briefly to FIG. 4, the despread signals on lines 24, 26, and 28 are represented as $r^{(l)}_d(n), l=1, \ldots, L$, where L is the total number of available paths to achieve the AFC, which is 3 in the present example. Loop filter 74 has a transfer function of $$F(z)=k_1+(k_2/4)(z^{-1}/1-z^{-1}),$$

where $k_1$ and $k_2$ are coefficients which can be set based on the desired response of the loop filter. Note that the output of the combiner is shifted by 4 kHz (or $\pi/4$ in discrete frequency) before being fed to the frequency detector. In contrast, prior art approaches achieve AFC but computing the error signal before combining (FIG. 1). The prior art requires several frequency detectors. Thus, the present invention is computationally less complex. Both the prior art system of FIG. 1 and the present invention are more reliable than the one where the AFC is obtained using only one path. They also assure continuous tracking even when some of the paths either enter a deep fade or lost.

To see the composition of the error signal, without loss of generality, the despread signal is denoted on the $1^{th}$ as $$r_{(l)d}(n)=\alpha_l\exp(j(w_0)nf_s), l=0, \ldots, L$$

where $\alpha_l$ is the channel coefficient.

In the above, we disregard the data modulation as well as the additive white Gaussian noise. The local reference signal is denoted by $$s(n)=\exp(j(w_0-\Delta w)nf_s$$

and it is assumed that $\Delta wf_s \ll 1$ and that the delay spread is at most of the order of $f_S$. The output of the combiner 22 is then given by, $$z(n) = \sum_{l=1}^{L} r_d^{(l)}(n)s^*(n)$$

$$= \sum_{l=1}^{L} \alpha_l B_l \exp(j(\Delta\omega)nf_s)$$

$$= \exp(j(\Delta\omega)nf_s \sum_{l=1}^{L} \alpha_l B_l$$

The term in the summation on the right hand side of the above equation varies very slowly compared to the exponential term and can be assumed to be constant for two successive symbols. Hence, the output of the frequency discriminator is proportional to $\Delta$.

The weights $B_l$, used to combine, are equal to $\alpha^*_l$, when they are optimized for maximum signal-to-noise ratio at the input of frequency discriminator 70. However, such an operation is already implicitly performed by discriminator 70 which performs a differential demodulation. Thus, $B_1$ can be set to a constant for all $l=1, \ldots, L$.

Note that the despread signal is averaged over 64 symbols and applied to the frequency discriminator. This is done to achieve the 64 ksamples/sec rate.

A W-CDMA system transceiver has been simulated with the above AFC scheme. The fading model that has been considered is the "Channel B" having a CLASSIC Doppler spectrum and is suggested by the Joint Technical Committee (JTC) for urban/sub-urban low-rise situations. The channel is simulated based on the tapped delay line model. The tap values are given in Table 1.

TABLE 1

Relative delays and weights of the taps used for the simulation of fading

| Tap | relative delay (nsec.) | average power (dB) |
|---|---|---|
| 1 | 0 | −2.5 |
| 2 | 300 | 0 |
| 3 | 8900 | −12.8 |

TABLE 1-continued

Relative delays and weights of the taps used for the simulation of fading

| Tap | relative delay (nsec.) | average power (dB) |
|---|---|---|
| 4 | 12900 | −10.0 |
| 5 | 17100 | −25.2 |
| 6 | 20000 | −16.0 |

Figure 7:
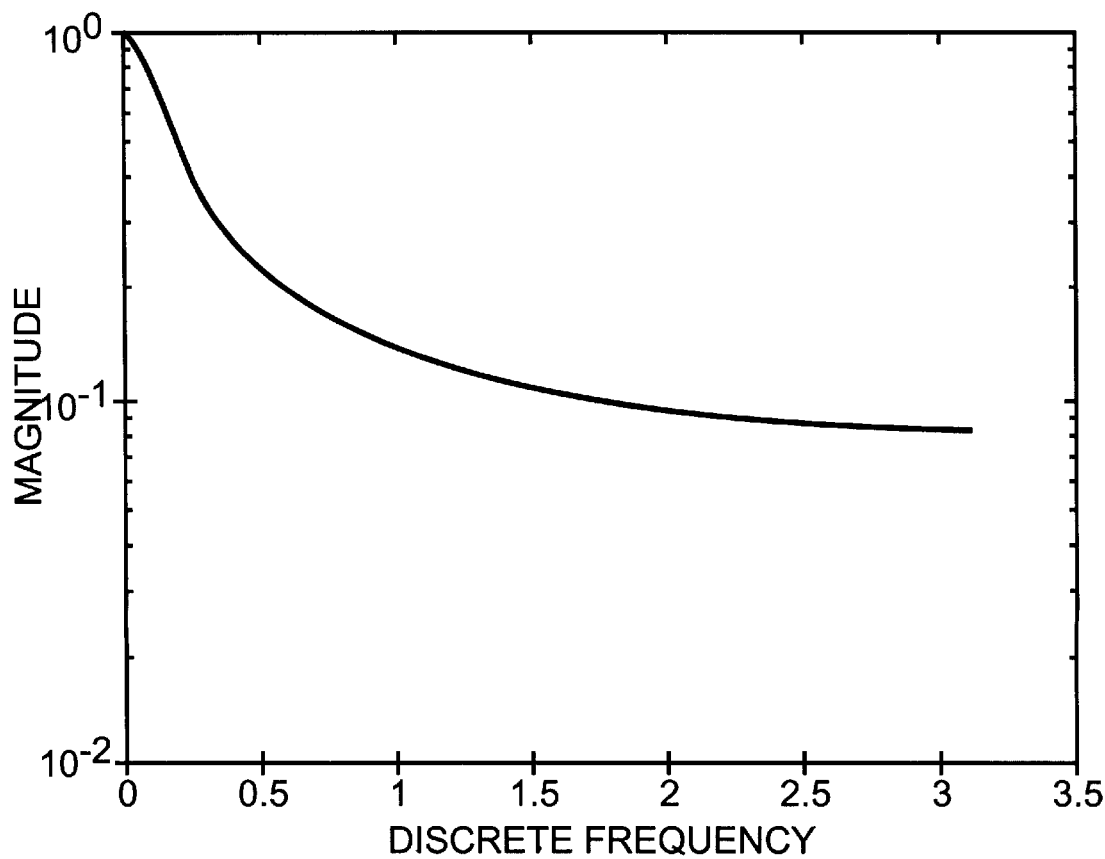
FIG. 7 illustrates the magnitude of the frequency response of the feedback system.
Figure 8:
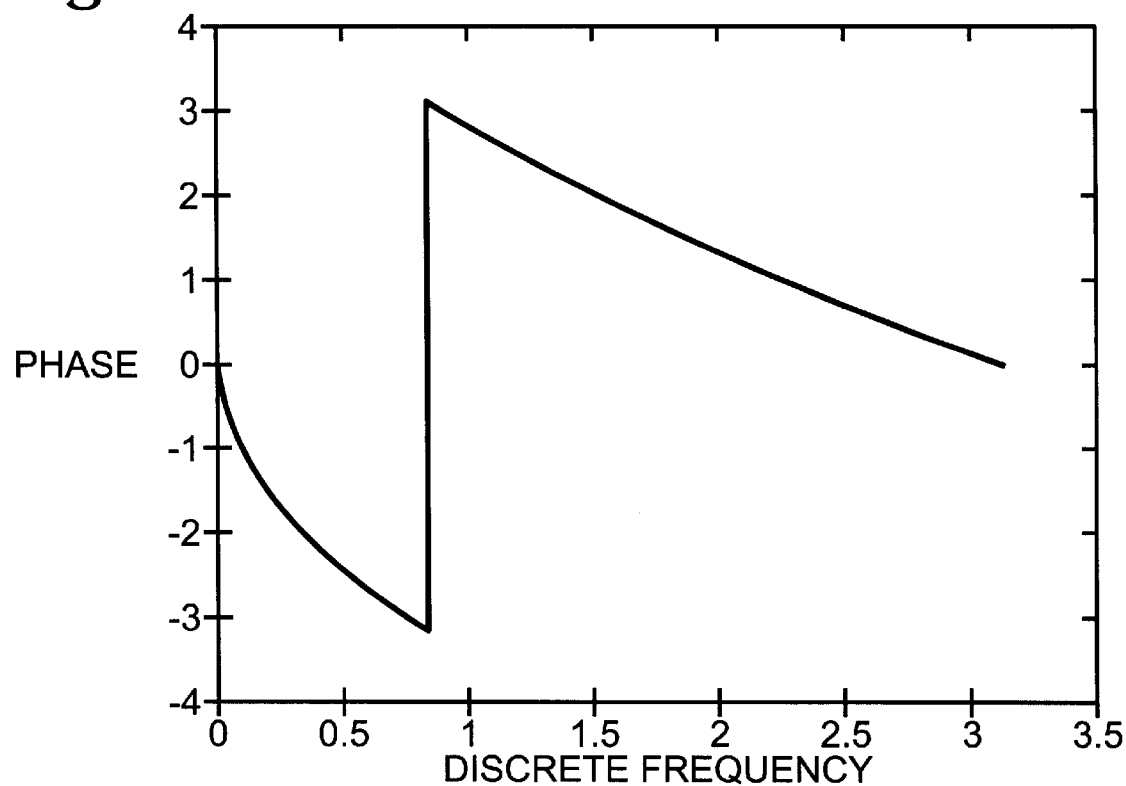
FIG. 8 illustrates the phase of the frequency response of the feedback system.
Figure 9:
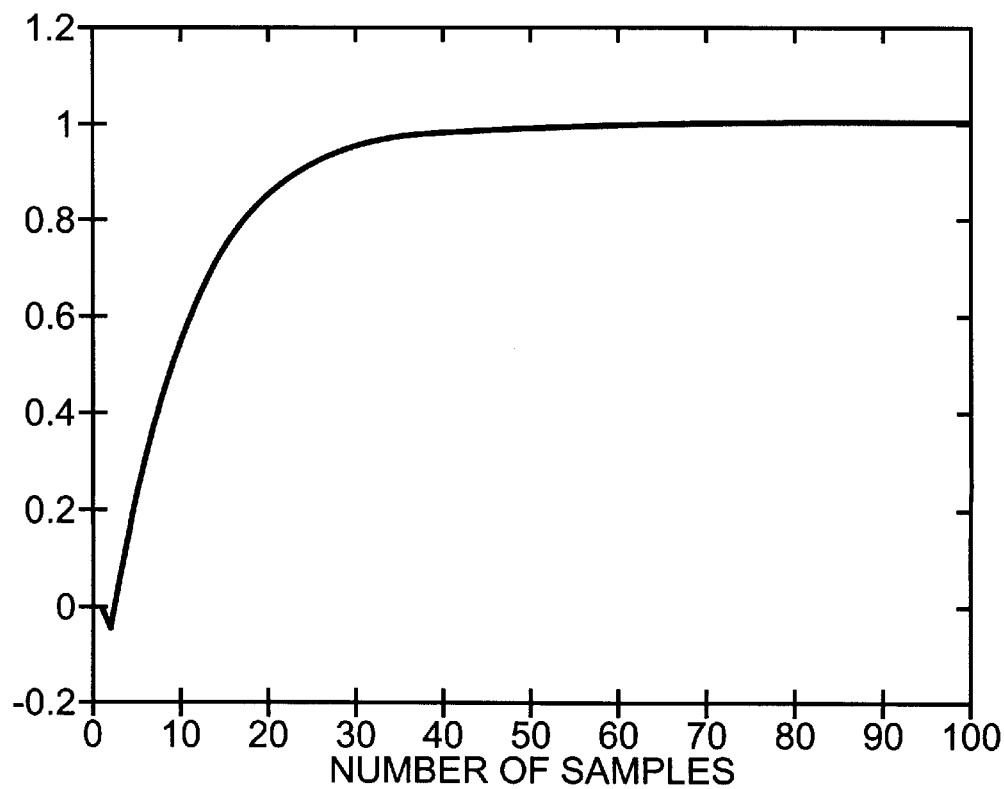
FIG. 9 illustrates the step response of the feedback system.

The Doppler frequency selected for this model is 50 Hz. For AFC section, $B_f=\frac{1}{6}$, for $l=1, \ldots, L$, and $k_1=-0.2728$ and $k_2=2.1488$. FIG. 7 illustrates the magnitude of the frequency response of the back system. FIG. 8 illustrates the phase of the frequency response of feedback system. FIG. 9 illustrates the step response of the feedback system. It should be noted that these parameters are selected so that the frequency discriminator always operates in the linear region.

Figure 10:
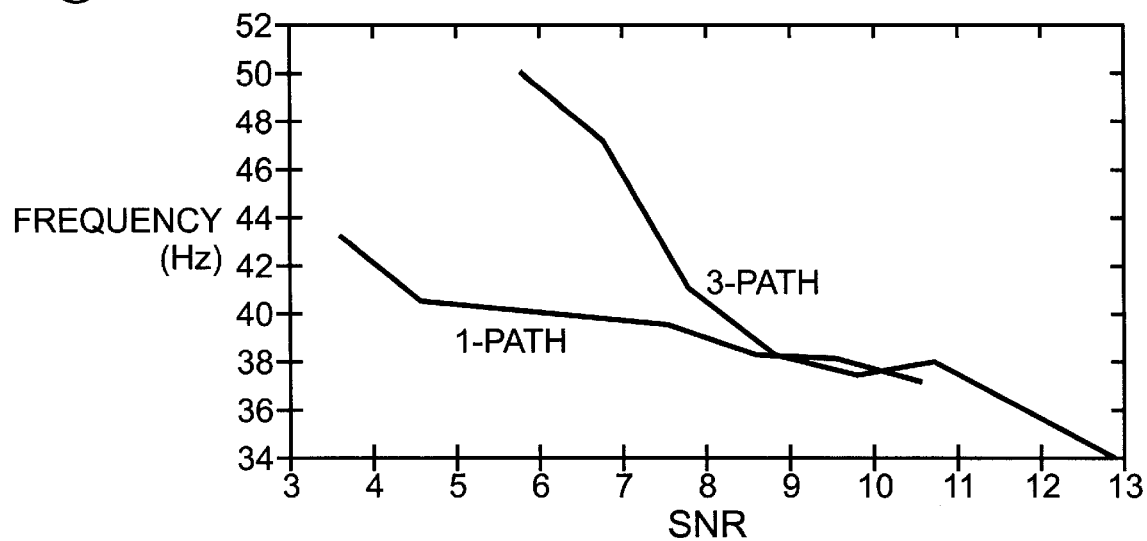
FIG. 10 compares the root means square frequency error of the present and prior art inventions.

FIG. 10 compares the root means square frequency error of present and prior art inventions. The coded data is generated randomly first as equi-probable binary digits which are then converted into QPSK symbols and then spread using QPSK for both the traffic as well as perch channel. The waveform obtained is then sampled at the rate of 4 samples/chip. It is assumed that there is a difference of 6 kHz between the local oscillator and the received signal. Additive white Gaussian noise (AWGN) is added to the sampled signal and then despread using the long codes under the assumption that all paths are tracked perfectly. Bit errors are determined by comparing the received data to the transmit data. The bit error rate computed through this process is almost same as the one obtained for a perfectly locked system and, hence, will not be discussed further. The performance of the combined system is obtained by plotting the root mean square frequency error in FIG. 10 for AFC using one and three paths. As is clearly seen from FIG. 10, both schemes achieve a tracking error of within 0.1 ppm (100 Hz).

Figure 11:
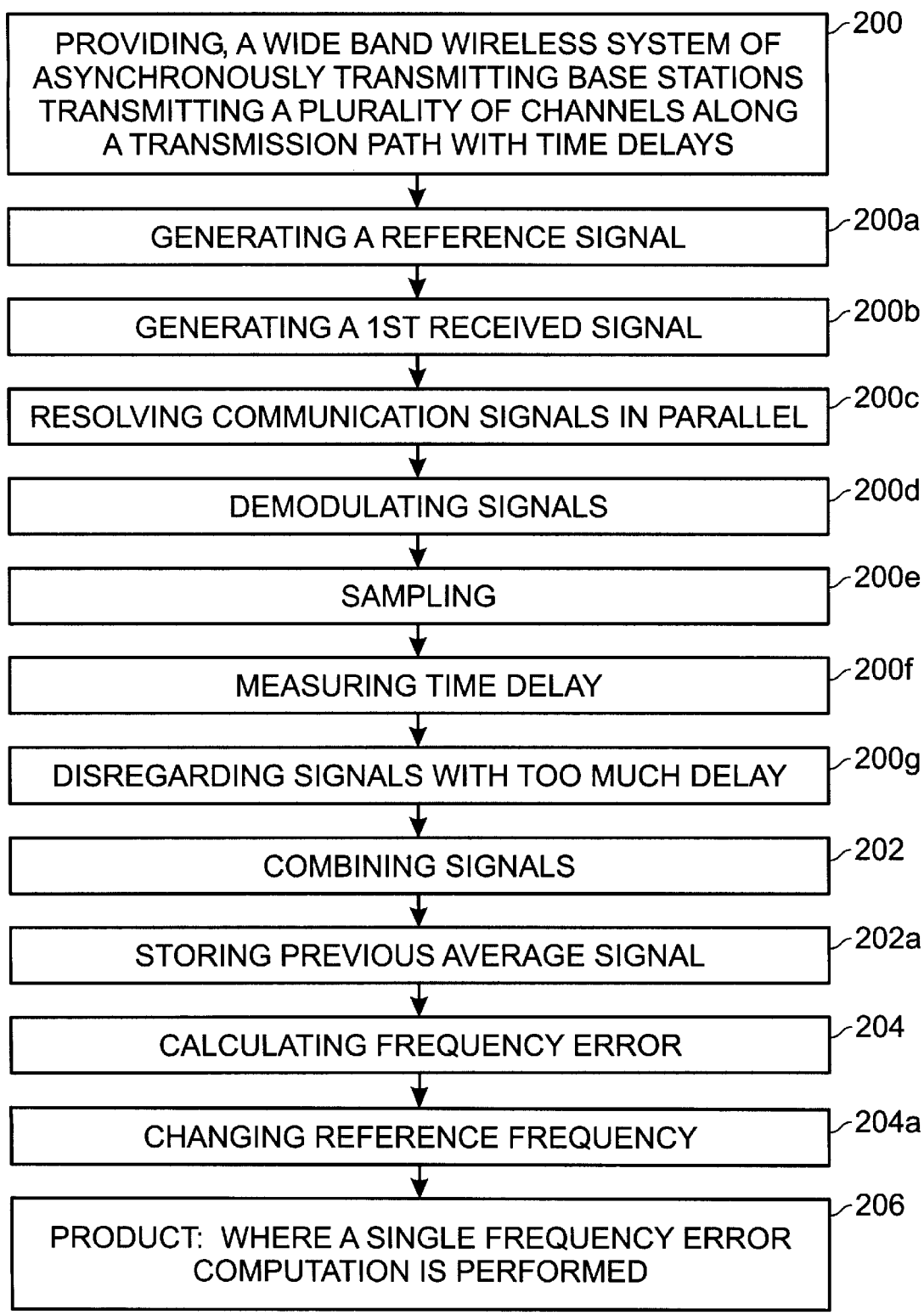
FIG. 11 is a flowchart illustrating a method for providing automatic frequency control (AFC) to track the carrier frequency of communication signals received along a plurality of transmission paths, with corresponding Doppler frequency shifts.

FIG. 11 is a flowchart illustrating a method for providing automatic frequency control (AFC) to track the carrier frequency of communication signals received along a plurality of transmission paths, with corresponding Doppler frequency shifts. Step 200 provides a wideband wireless communication system including mobile stations receiving communications from at least one base station. Step 202 combines received communication signals from each transmission path, whereby an average received communication signal is derived. Step 204, in response to the average received communication signal derived in Step 202, calculates the frequency error of the average received communication signal. Step 206 is a product where only a single frequency error computation is performed.

In some aspects of the invention, further steps precede Step 202. Step 200a generates a reference signal having a reference frequency. Step 200b, in response to the reference signal and the received carrier signal for each transmission path, generates a first received signal for each transmission path. In some aspects of the invention, Step 200a includes the reference signal being a local oscillator (LO) signal with a LO frequency. Step 200b includes mixing the LO signal with the received carrier signal of each transmission path. Then, Step 202 includes combining first received signals, whereby the received carrier signals are converted to first received signals. Step 200b typically includes downconverting the received carrier signals to first received signals. That is, the first received signals have baseband frequencies.

Typically, further steps precede Step 202. Step 200c resolves the received communication signals of each transmission path in parallel. Step 200d demodulates the received communication signals of each transmission path to generate a corresponding received carrier signal.

In some aspects of the invention, further steps follow Step 204. Step 204a, in response to the frequency error calculated in Step 204, changes the reference frequency, whereby the first frequency of each transmission path is corrected with a single error signal.

In some aspects of the invention, further steps follow Step 204a (not shown). Step 204b compares the signal to noise ratio of first r received signal of each transmission path with the signal to noise ratio of the average first received signal generated in Step 202. Step 204c, in response to the difference between the signal to noise ratios calculated in Step 204b, calculates a weight for each transmission path. Then, Step 202 includes, in response to the weights calculated in Step 204b, variably adjusting the importance of each transmission path in the averaging of first received signals, whereby the signal to noise ratio of the combination of received signals is improved. As noted above, in the preferred embodiment of the invention, the uses of weights is not necessary to achieve reliable accuracy.

In some aspects of the invention, further steps precede Step 204. Step 202a stores the previous average first received signal. Then Step 204 includes sub-steps (not shown). Step $204_1$ detects changes between the average first received signal and the average first received signal stored in Step 202a. Step $204_2$ generates an error signal in response to the frequency change detected in $204_1$. Then, Step 204a, in response to the error signal generated in Step $204_2$, includes changing the reference frequency.

In some aspects of the invention, Step 200 provides each transmission path with a corresponding time delay. Then, further steps precede Step 202. Step 200e samples the received communication signals at a rate of $f_s$. Step 200f measures a time delay equal to $1/f_s$. Step 200g disregards communication signals received after the $1/f_s$ time delay has expired. Step 202 includes summing the received communication signals is having a time delay less than, or equal to the time duration $1/f_s$, whereby the average received communication signal frequency error is less noisy.

A system and method has been presented above to combine several paths for the generation of a single error signal. This simplification improves the overall reliability of the system, as the scheme still works when one or more of the paths drop out. Further, the design puts fewer constraints on the control software. This scheme is also simpler than the scheme used in all known IS-95 mobile station modems, where several frequency detectors are needed to generate the same error signal. Other variations and embodiments will occur to those skilled in the art.

What is claimed is:

1. In a wideband wireless communication system including mobile stations receiving communications from at least one base station, a method for providing automatic frequency control (AFC) to track the carrier frequency of communication signals received along a plurality of transmission paths, with corresponding Doppler frequency shifts, the method comprising the steps of:

generating a reference signal having a reference frequency;

combining received communication signals from each transmission path, whereby an average received communication signal is derived;

in response to the reference signal and the received carrier signal for each transmission path, generating a first received signal for each transmission path;

combining the first received signals and providing an average first received signal;

in response to the average received communication signal, calculating the frequency error of the average received communication signal, whereby only a single frequency error computation is performed;

in response to the frequency error calculated, changing the reference frequency, whereby the first frequency of each transmission path is corrected with a single error signal;

comparing the signal to noise ratio of the first received signal of each transmission path with the signal to noise ratio of the average first received signal;

in response to the difference between the signal to noise ratios calculated, calculating a weight for each transmission path; and in response to the weights calculated, variably adjusting the importance of each transmission path in the averaging of first received signals, whereby the signal to noise ratio of the combination of received signals is improved.

2. In a wideband wireless communication system including mobile stations receiving communications from at least one base station, a method for providing automatic frequency control (AFC) to track the carrier frequency of communication signals received along a plurality of transmission paths, with corresponding Doppler frequency shifts, the method comprising the steps of:

generating a reference signal having a reference frequency;

combining received communication signals from each transmission path, whereby an average received communication signal is derived;

in response to the reference signal and the received carrier signal for each transmission path, generating a first received signal for each transmission path;

combining the first received signals and providing an average first received signal;

storing a previous average first received signal;

in response to the average received communication signal, calculating the frequency error of the average received communication signal, including the sub-steps of:

1) detecting changes between the average first received signal and the average first received signal stored; and 2) generating an error signal in response to the frequency change detected; and in response to the error signal generated, changing the reference frequency, whereby the first frequency of each transmission path is corrected with a single error signal.

3. In a wideband wireless communication system including mobile stations receiving communications from at least one base station, a method for providing automatic frequency control (AFC) to track the carrier frequency of communication signals received along a plurality of transmission paths, with corresponding Doppler frequency shifts, each transmission path having a corresponding time delay, the method comprising the steps, of:

sampling received communication signals at a rate of $f_s$; measuring a time delay equal to $1/f_s$;

disregarding communication signals received after the $1/f_s$ time delay has expired;

combining received communication signals from each transmission path, including summing the received communication signals having a time delay less than, or equal to the time duration $1/f_s$, whereby an average received communication signal is derived; and in response to the average received communication signal derived, calculating the frequency error of the average received communication signal, whereby only a single frequency error computation is performed.

4. In a wideband wireless communication system receiver to accept communications propagated along a plurality of transmission paths with corresponding doppler frequency shifts, an automatic frequency control (AFC) system to track the carrier frequency of received communications comprising:

a clock having an output to provide a periodic time interval measurement of $1/f_s$, where $f_s$ is the rate at which the received multipathed signal is sampled;

a combiner having a plurality of inputs, with each input corresponding to a transmission path, to accept received communication signals with received communication frequencies, and having an output to provide an average received communication signal, said combiner having a clock input to accept the $1/f_s$ time interval measurements, said combiner summing the communication signals received over a time interval of $1/f_s$ and disregarding communication signals received after the $1/f_s$ time delay has expired to calculate said average received communication signal, whereby the average received communication signal frequency error is less noisy; and a frequency error calculator having an input operatively connected to said combiner output to accept the average received communication signal, and an output to provide an frequency error signal in response to the average received communication signal, whereby the multipathed received signals are averaged before the frequency error is calculated.

* * * * *